United States Patent
Zaghib et al.

(10) Patent No.: US 9,559,355 B2
(45) Date of Patent: Jan. 31, 2017

(54) PARTICULATE ANODE MATERIALS AND METHODS FOR THEIR PREPARATION

(71) Applicant: Hydro-Quebec, Montreal (CA)

(72) Inventors: Karim Zaghib, Longueuil (CA); Abdelbast Guerfi, Brossard (CA); Dominic Leblanc, Gentilly (CA)

(73) Assignee: Hydro-Québec, Montreal, Quebec (CA)

( * ) Notice: Subject to any disclaimer, the term of this patent is extended or adjusted under 35 U.S.C. 154(b) by 0 days.

(21) Appl. No.: 14/345,786

(22) PCT Filed: Sep. 19, 2012

(86) PCT No.: PCT/CA2012/050651
§ 371 (c)(1),
(2) Date: Mar. 19, 2014

(87) PCT Pub. No.: WO2013/040705
PCT Pub. Date: Mar. 28, 2013

(65) Prior Publication Data
US 2014/0246398 A1 Sep. 4, 2014

(30) Foreign Application Priority Data
Sep. 19, 2011 (CA) .................................. 2752844

(51) Int. Cl.
*B31D 3/00* (2006.01)
*H01M 4/36* (2006.01)
(Continued)

(52) U.S. Cl.
CPC ............ *H01M 4/366* (2013.01); *C01B 33/113* (2013.01); *H01M 4/0471* (2013.01);
(Continued)

(58) Field of Classification Search
CPC ............... C01B 33/113; H01M 10/052; H01M 2004/021
(Continued)

(56) References Cited

U.S. PATENT DOCUMENTS

| 5,910,382 A | 6/1999 | Goodenough et al. |
| 6,391,493 B1 | 5/2002 | Goodenough et al. |

(Continued)

FOREIGN PATENT DOCUMENTS

| CN | 100423197 C | 10/2008 |
| CN | 101636861 A | 1/2010 |

(Continued)

OTHER PUBLICATIONS

International Search Report (PCT/ISA/210) mailed on Dec. 11, 2012, by the Canadian Patent Office as the International Searching Authority for International Application No. PCT/CA2012/050651.
(Continued)

*Primary Examiner* — Duy Deo
*Assistant Examiner* — Maki Angadi
(74) *Attorney, Agent, or Firm* — Buchanan Ingersoll & Rooney P.C.

(57) ABSTRACT

Method for preparing a particulate material including particles of an element of group IVa, an oxide thereof or an alloy thereof, the method including: (a) dry grinding particles from an ingot of an element of group IVa, an oxide thereof or an alloy thereof to obtain micrometer size particles; and (b) wet grinding the micrometer particles dispersed in a solvent carrier to obtain nanometer size particles having a size between 10 to 100 nanometers, optionally a stabilizing agent is added during or after the wet grinding. Method can include further steps of (c) drying the nanometer size particles, (d) mixing the nanometer size particles with a carbon precursor; and (e) pyrolyzing the mixture, thereby
(Continued)

forming a coat of conductive carbon on at least part of the surface of the particles. The particulate material can be used in fabrication of an anode in an electrochemical cell or electrochemical storage energy apparatus.

17 Claims, 10 Drawing Sheets

(51) Int. Cl.
| | |
|---|---|
| *C01B 33/113* | (2006.01) |
| *H01M 4/38* | (2006.01) |
| *H01M 4/48* | (2010.01) |
| *H01M 4/62* | (2006.01) |
| *H01M 4/04* | (2006.01) |
| *H01M 4/1395* | (2010.01) |
| *H01M 4/1391* | (2010.01) |
| H01M 10/052 | (2010.01) |
| H01M 4/02 | (2006.01) |
| H01M 4/131 | (2010.01) |
| H01M 4/134 | (2010.01) |

(52) U.S. Cl.
CPC ....... *H01M 4/1391* (2013.01); *H01M 4/1395* (2013.01); *H01M 4/386* (2013.01); *H01M 4/48* (2013.01); *H01M 4/483* (2013.01); *H01M 4/625* (2013.01); *H01M 4/131* (2013.01); *H01M 4/134* (2013.01); *H01M 10/052* (2013.01); *H01M 2004/021* (2013.01); *Y02E 60/122* (2013.01)

(58) Field of Classification Search
USPC ........ 216/56; 438/684; 429/218.1, 220, 223, 429/231.95
See application file for complete search history.

(56) References Cited

U.S. PATENT DOCUMENTS

| | | | |
|---|---|---|---|
| 7,473,443 | B2 | 1/2009 | Matsuki et al. |
| 8,507,135 | B2 | 8/2013 | Grupp |
| 8,697,290 | B2* | 4/2014 | Babinec et al. ............. 429/252 |
| 2003/0157407 | A1 | 8/2003 | Kosuzu et al. |
| 2005/0145163 | A1* | 7/2005 | Matsuki et al. ............. 117/68 |
| 2008/0280141 | A1 | 11/2008 | Dobbs et al. |
| 2010/0323245 | A1* | 12/2010 | Liang ........................ 429/231.5 |
| 2011/0068294 | A1 | 3/2011 | Zaghib et al. |
| 2011/0244333 | A1 | 10/2011 | Kawada |
| 2011/0244334 | A1 | 10/2011 | Kawada |
| 2013/0040183 | A1* | 2/2013 | Leitner et al. ............... 429/144 |
| 2013/0122300 | A1 | 5/2013 | Dobbs et al. |
| 2013/0136986 | A1 | 5/2013 | Scoyer et al. |

FOREIGN PATENT DOCUMENTS

| | | |
|---|---|---|
| CN | 102142536 A | 8/2011 |
| EP | 2 237 346 A1 | 10/2010 |
| JP | 2004-087546 A | 3/2004 |
| JP | 2004-185810 A | 7/2004 |
| JP | 2008-112710 A | 5/2008 |
| JP | 2010-219047 A | 9/2010 |
| WO | WO 2007/100918 A2 | 9/2007 |
| WO | WO 2008/067677 A1 | 6/2008 |
| WO | 2011/060433 A1 | 5/2011 |
| WO | WO 2012/000854 A1 | 1/2012 |
| WO | WO 2012/000858 A1 | 1/2012 |

OTHER PUBLICATIONS

Written Opinion (PCT/ISA/237) mailed on Dec. 11, 2012, by the Canadian Patent Office as the International Searching Authority for International Application No. PCT/CA2012/050651.

The extended European Search Report issued on Feb. 5, 2015, by the European Patent Office in corresponding European Patent Application No. 12833047.9-1360. (7 pages).

Dimov et al., "Carbon-coated Silicon as Anode Material for Lithium Ion Batteries: Advantages and Limitations," Electrochimica Acta, (May 15, 2003), vol. 48, Issue 11, pp. 1579-1587.

Veluchamy et al., "Silicon Based Composite Anode for Lithium Ion Battery," Nanocomposites and Polymers with Analytical Methods, Dr. John Cuppoletti (Ed.), ISBN: 978-953-307-352-1, InTech, DOI:10-5772/17118. (Aug. 9, 2011), Chapter 14, pp. 335-360. Available from: http://www.intechopen.com/books/nanocomposites-and-polymers-with-analytical-methods/silicon-based-composite-anode-for-lithium-ion-battery.

Wang et al., "Carbon-coated Si-Cu/graphite Composite as Anode Material for Lithium-ion Batteries," International Journal of Electrochemical Science, (2001), vol. 1, pp. 122-129.

Zuo et al., "Electrochemical Stability of Silicon/Carbon Composite Anode for Lithium Ion Batteries," Electrochimica Acta, (Apr. 20, 2007), vol. 52, Issue 15, pp. 4878-4883.

Office Action issued in Japanese Application 2014-50062 on Jun. 21, 2016 (4 pages) (English Translation).

* cited by examiner

PARTICULATE ANODE MATERIALS AND METHODS FOR THEIR PREPARATION

CROSS REFERENCE TO RELATED APPLICATIONS

The present application is a U.S. national stage entry of International Application No. PCT/CA2012/050651, filed on Sep. 19, 2012, which claims the benefit of Canadian Application No. 2,752,844, filed on Sep. 19, 2011. The entire contents of each of International Application No. PCT/CA2012/050651 and Canadian Application No. 2,752,844 are hereby incorporated herein by reference in their entirety.

FIELD OF THE INVENTION

The invention relates generally to particulate materials having high electrochemical energy storage capacities. More specifically the invention relates to particulate anode materials comprising elements of group IVa, preferably silicon, oxides thereof or alloys thereof. The materials according to the invention can have deposited thereon conductive carbon. Methods for their preparation involve dry and wet grinding steps.

BACKGROUND OF THE INVENTION

Lithium-ion batteries have shown technical success and commercial growth since the initial work by Sony in the early 90's based on lithium insertion electrodes; essentially consisting of high voltage cobalt oxide cathode invented by J. B. Goodenough (U.S. Pat. No. 5,910,382 and U.S. Pat. No. 6,391,493) and carbon anode using coke or graphitized carbonaceous materials.

Since then, lithium-ion batteries have progressively replaced existing Ni—Cd and Ni-MH batteries, because of their superior performances in most portable electronic applications. However, because of their cost and intrinsic instability under abusive conditions, especially in their fully charged state, only small size and format cells have been commercialized with success.

Existing lithium-ion batteries rely on anodes made from graphite. However, the anode based on the carbonaceous material has a maximum theoretical capacity of only 372 mAh/g (844 mAh/cc), thus suffering from limited increase of capacity. Lithium metals, studied for use as the anode material, have a high energy density and thus may realize high capacity, but present problems associated with safety due to growth of dendrites and a shortened charge/discharge life cycle as the battery is repeatedly charged/discharged. Because of these disadvantages and problems, a number of studies have been conducted and suggestions have been made to utilize silicon, tin or their alloys as possible candidate materials exhibiting high capacity and capable of replacing lithium as metal. For example, silicon (Si) reversibly absorbs (intercalates) and desorbs (deintercalates) lithium ions through the reaction between silicon and lithium, and has a maximum theoretical capacity of about 4200 mAh/g (9366 mAh/cc, a specific gravity of 2.23) that is substantially higher than that of carbonaceous materials and thereby is promising as a high-capacity anode material.

Silicon-based anodes theoretically offer as much as a ten-fold capacity improvement over graphite. However, silicon-based anodes have not been stable enough to cycling for practical use. One way of improving the cycle performance of silicon-based anodes is to reduce the size of the particles in the material used in the fabrication of the anode. Coating of the particles in the material used with carbon has also been found beneficial. The smaller size helps to control the volume change and stresses in the Si particles. The carbon coating on the silicon surface acts like an electrical pathway so that even when there is a volume change, contact is not lost with the current collector.

Silicon is produced industrially by carbothermal reduction of silicon dioxide (quartzite) with carbon (coal, charcoal, petroleum coke, wood) in arc furnaces by a reaction that in an idealized form can be written as:

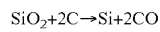

$$SiO_2 + 2C \rightarrow Si + 2CO$$

In industry, the available raw materials are not pure and the product generally contains other elements, such as Fe, Al, Ca and Ti. With pure operation and pure raw materials and electrodes, it is possible to obtain silicon with less than 1-2% percent of other elements. This product is traditionally called metallurgical grade silicon metal even though solid silicon is not a metal.

If higher purity is required, metallurgical treatments like gas blowing (dry air, $O_2$, $Cl_2$) may reduce alkaline species (K, Na, Mg, Ca, Al, Sr) at temperatures higher than 1410° C. Those species will either be volatized from the liquid metal surface or be physically separated in a slag phase. If transition elements such as Fe, Ti, Cu, Cr, Mn, V, Ni, Zn, Zr, etc. need to be reduced, directional solidification may be used. Another efficient method consists of finely grinding solid silicon and expose the intermetallic phases to acid (HF, HCl, $H_2SO_4$ or a mixture). With those metallurgical treatments, the silicon metal purity can reach 99.999% (5N purity level).

For higher purity, chemical vapour deposition of Si from precursor species like $SiHCl_3$ or $SiH_4$ is needed. The so-called Siemens process is a perfect example. This process can easily reach a 9N purity level.

Silicon-based anode materials can be prepared at low cost from solid crystalline ingots or micron size powders by conventional grinding process (jaw crusher, cone crusher, roll crusher, jet mill, etc.). Mechanical attrition process is one of the most used processes to produce fine particles. Industrial wet nano-grinding bead mill equipment is available commercially, which can be used to reduce particle size down to 10 to 20 nm; see for example WO 2007/100918 for lithium metal phosphate ultrafine grinding. These techniques are especially useful for high purity Si.

One significant improvement to the problem of low electronic conductivity of complex metal alloy anode powders, and more specifically of Si-based materials, was achieved with the use of an organic carbon precursor that is pyrolysed onto the anode material or its precursor to improve electrical conductivity at the level of the anode particles.

It is also known that the electrical conductivity of a silicon powder is improved by intimately mixing conductive carbon black or graphite powder with the Si powder or the Si-alloys before grinding. Such addition of carbon black or graphite powder involves usually relatively large quantities of C to achieve good connectivity and does not result in a good bonding of the C to the silicon-based material crystal structure. This intimate bonding is a characteristic that is judged to be essential to maintain contact despite volume variations during long term cycling.

The inventors are aware of the following documents that relate to the invention: WO 2012/000854 and WO 2012/

000858 both of Scoyer et al., U.S. 2011/0244334 and 2011/0244333 both of Kawada, and WO 2008/067677 of Liang et al.

There is still a need for improved methods for the preparation of particulate silicon-based materials that allow for the fabrication of high electrochemical energy storage capacity anodes.

SUMMARY OF THE INVENTION

The inventors have designed a method for the preparation of a particulate material which comprises an element of group IVa, preferably silicon, an oxide thereof or an alloy thereof. The method involves dry and wet grinding steps to yield nanometer size particles. The nanometer size particles can be coated with conductive carbon. The element of group IVa can be Si. The alloy can comprise at least one of Li, Al, Mg, Fe, Ge, C, Bi, Ag, Sn, Zn, B, Ti, Sr, P and O. The material prepared by the method according to the invention is used as anode.

According to an aspect, the invention provides the following:

(1) A method for preparing a particulate material comprising particles of an element of group IVa, an oxide thereof or an alloy thereof, the method comprising:
 (a) dry grinding particles from an ingot of an element of group IVa, an oxide thereof or an alloy thereof to obtain micrometer size particles; and
 (b) wet grinding the micrometer particles dispersed in a solvent carrier to obtain nanometer size particles having a size between 10 to 100 nanometers, optionally a stabilizing agent is added during or after the wet grinding.

(2) A method according to (1) above, wherein the element is Si.

(3) A method according to (1) above, wherein the oxide is an Si oxide ($SiO_x$).

(4) A method according to (1) above, wherein the alloy comprises at least one of Li, Al, Mg, Fe, Ge, C, Bi, Ag, Sn, Zn, B, Ti, Sr, P and O.

(5) A method according to (1) or (4) above, wherein an amount of the alloying elements is about 2% wt or less of the particulate material.

(6) A method according to (1) above, further comprising a step of (c) drying the nanometer size particles.

(7) A method according to (1) or (6) above, further comprising the steps of: (d) mixing the nanometer size particles with a carbon precursor; and (e) pyrolysing the mixture, thereby forming a coat of conductive carbon on at least part of the surface of the particles.

(8) A method according to any one of (1) to (7) above, wherein step (a) is performed in a bead mill, preferably using zirconia beads; a puck and ring mill; a jet mill; or a cyclone mill.

(9) A method according to any one of (1) to (8) above, wherein the carrier solvent is an organic solvent or water.

(10) A method according to any one of (1) to (8) above, wherein the solvent is isopropanol or cyclohexane.

(11) A method according to any one of (1) to (10) above, wherein an amount of the solvent carrier is adjusted such as to represent about 5-20% wt of the particulate material.

(12) A method according to any one of (1) to (10) above, wherein an amount of the solvent carrier is adjusted such as to represent about 8-15% wt of the particulate material.

(13) A method according to any one of (1) to (10) above, wherein an amount of the solvent carrier is adjusted such as to represent about 10% wt of the particulate material.

(14) A method according to any one of (1) to (13) above, wherein the carbon precursor is an organic material.

(15) A method according to any one of (1) to (13) above, wherein the carbon precursor is a cross-linkable monomer, oligomer, polymer or copolymer.

(16) A method according to any one of (1) to (13) above, wherein the carbon precursor poly(maleic anhydride-1-alt-octadecene).

(17) A method according to (7) above, wherein an amount of conductive carbon formed is about 0.5-10% wt of the particulate material.

(18) A method according to (7) above, wherein an amount of conductive carbon formed is about 2-5% wt of the particulate material.

(19) A method according to (7) above, wherein step (e) is performed at a temperature of about 600-800° C., preferably about 650-750° C., more preferably about 730° C.

(20) A method according to (7) or (19) above, wherein step (e) is performed at a rate of about 3-10° C./min, preferably about 6° C./min.

(21) A method according to (7), (19) or (20) above, wherein step (e) is performed during a period of about 30 minutes to 2 hours, preferably about 1 hour.

(22) A method according to any one of (7) and (19) to (21) above, wherein step (e) is performed under inert atmosphere, preferably argon atmosphere.

(23) A method according to any one of (7) and (17) to (22) above, wherein the conductive carbon is non-powdery.

(24) A method according to any one of (1) to (23) above, wherein the stabilizing agent is a surfactant.

(25) A method according to any one of (1) to (23) above, wherein the stabilizing agent is a Triton 100X.

(26) A method according to any one of (1) to (25) above, wherein the particulate material is used as an anode in an an electrochemical cell or an electrochemical storage energy apparatus.

(27) A method according to (26) above, wherein the electrochemical storage energy apparatus is a lithium-ion battery.

(28) A method according to (26) above, wherein the electrochemical storage energy apparatus is a silicon-air battery.

(29) A method according to (26) above, wherein the electrochemical storage energy apparatus is a polymer battery.

DESCRIPTION OF PREFERRED EMBODIMENTS

The inventors have designed a method for the preparation of a particulate material which comprises an element of group IVa, preferably silicon, an oxide thereof or an alloy thereof. The method involves dry and wet grinding steps to yield nanometer size particles. The nanometer size particles can be coated with conductive carbon. The element of group IVa can be Si. The alloy can comprise at least one of Li, Al, Mg, Fe, Ge, C, Bi, Ag, Sn, Zn, B, Ti, Sr, P and O. The material prepared by the method according to the invention is used as anode.

Figure 1:
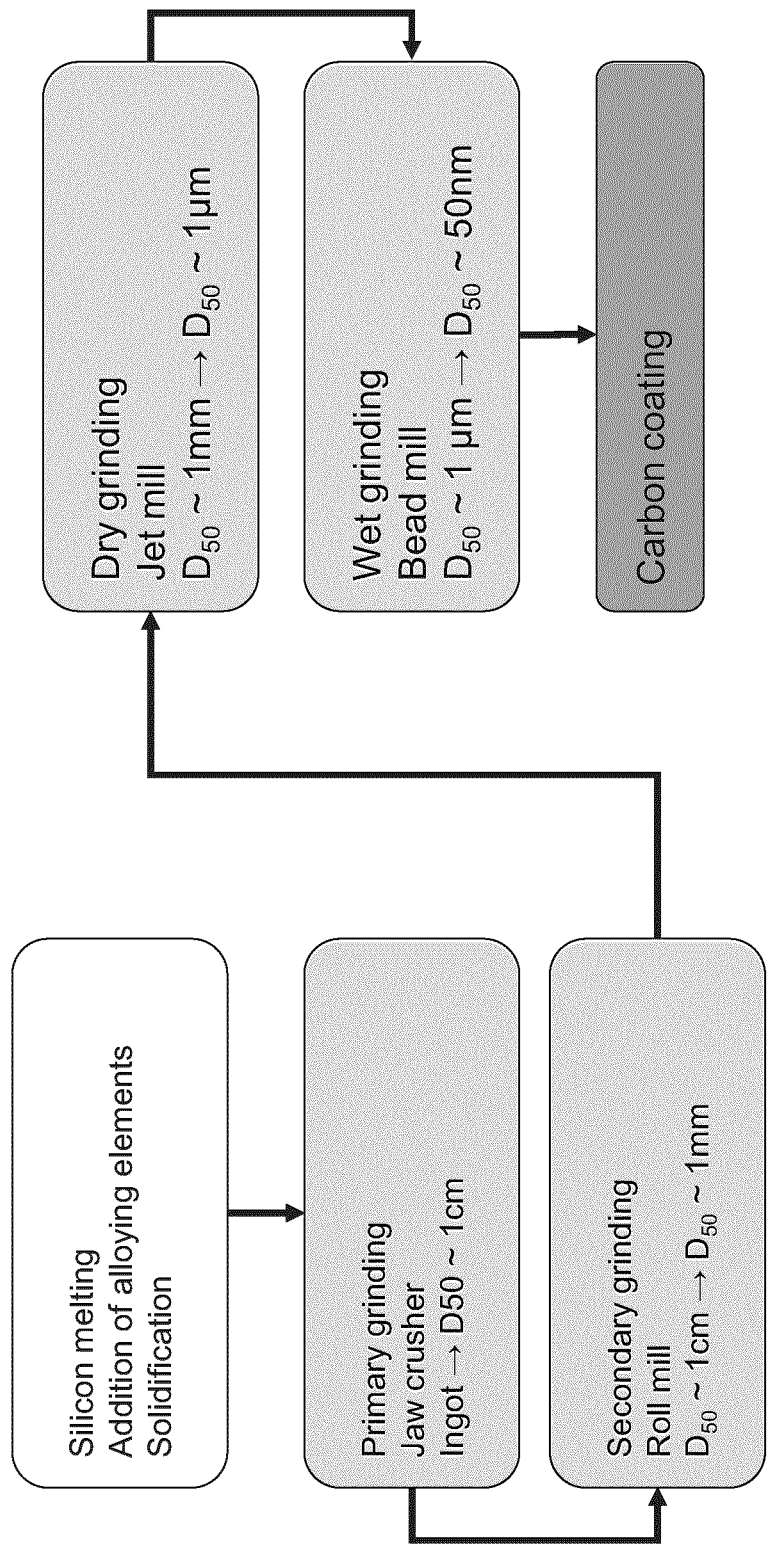
FIG. 1 shows a process flow diagram illustrating the method according to the invention.

In preferred embodiments of the invention, the element of group IVa is Si or the oxide is an Si oxide ($SiO_x$). A process flow diagram of the method according to the invention is outlined in FIG. 1.

A method for preparing a particulate Si material, wherein at least part of the surface of the particles can be coated with conductive carbon. The method comprises the following steps: (a) dry grinding Si particles from an ingot of Si or $SiO_x$ to obtain micrometer size particles; and (b) wet grinding the micrometer particles dispersed in a solvent carrier to obtain nanometer size particles having a size between 10 to 100 nanometers. Optionally, a stabilizing agent can be added during or after the wet grinding step. Such agent helps in avoiding agglomeration of the particles. Also, it allows for an effective dispersion of the particles in the solvent carrier. Suitable stabilizing agents are described for example in WO 2008/067677. They are generally commercially available and include for example surface active agents such as surfactants. As will be understood by a skilled person, any other suitable stabilizing agent can be used.

The method can comprise the further step of (c) drying the nanometer size particles. Moreover, the method can comprise the further steps of: (d) mixing the nanometer size particles obtained either in step (b) or in step (c) with a carbon precursor; and (e) pyrolysing the mixture, thereby forming a coat of conductive carbon on at least part of the surface of the particles.

The Si particles used in step (a) are millimeter size particles which can be obtained by the following steps: (a1) providing commercially available metallurgical grade Si; (a2) melting the Si; (a3) casting and cooling the melted Si to obtain ingots; and (a4) crushing the ingots to obtain the millimeter size Si particles. Melting of the starting material can be performed in an induction furnace using a graphite crucible. As will be understood by a skilled person any other suitable means for melting can be used in the process. Also, the melting process is performed under inert atmosphere wherein an inert gas such as for example argon, is used.

The temperature of the melted Si is raised to about 1410-1650° C., preferably about 1450° C., and then it is casted in a mould and cooled to room temperature. A suitable mould type used in the process can be for example a graphite mould; however, as will be understood by a skilled person any other suitable mould type can be used. Ingots formed after cooling the melted Si are crushed into centimeter size particles, then into millimeter size particles. The crushing can be performed using a jaw crusher which can have an abrasion resistant liner, such as zirconia or tungsten carbide. Such crushing will generally yield centimeter size particles which are further ground into millimeter size particles using for example a roll crusher.

In an embodiment of the invention, dry grinding of the millimeter size Si particles into micrometer particles (step (a) outlined above) can be performed for example in a jet mill, a bead mill, a puck and ring mill, or a cyclone mill. As will be understood by a skilled person, any other suitable grinding means can be used. Beads used with a bead mill can be for example 5 mm zirconia beads.

The micrometer size Si particles are dispersed into a solvent carrier then subjected to grinding (wet grinding) into nanometer size particles (step (b) outlined above). This step can be performed for example in a bead mill with 0.3 mm zirconia beads. The solvent carrier can be an organic solvent. For example, the carrier solvent can be an alcohol such as a $C_1$-$C_{12}$ alcohol or water. In embodiments of the invention, the micrometer size particles were dispersed in isopropanol or furfuryl alcohol; however as will be understood by a skilled person, any other suitable solvent can be used in the process. The solvent carrier is used in an amount of about 5-20% wt, preferably about 8-15% wt, more preferably about 10% wt of the amount of Si.

The nanometer size Si particles can further be mixed with a carbon precursor (step (c) outlined above). In embodiments of the invention, the particles are in wet form, i.e. still in the solvent carrier (particles obtained from step (b) outlined above). In other embodiments, the particles are in wet form (particles obtained from step (c) outlined above). The carbon precursor is intimately mixed with the Si particles in order to achieve impregnation of the particles surface such that after pyrolysis (step (e) outlined above), the conductive carbon deposited is in intimate contact with the particles.

The carbon precursor can be an organic carbon precursor. Moreover, the carbon precursor can be for example a cross-linkable monomer, oligomer, polymer or copolymer, preferably poly(maleic anhydride-1-alt-octadecene). As will be understood by a skilled person, any suitable material capable of being adsorbed on the surface of the nanometer size Si particles such as to leave thereon after pyrolysis a layer of conductive carbon, can be used in the process. In embodiments of the invention, the amount of carbon precursor used can be for example about 2-10% wt, preferably about 5% wt of the amount of Si.

The mixture of nanometer size Si particles and carbon precursor is subjected to pyrolysis (step (e) outlined above). This step allows for burning of the carbon precursor and deposit of a layer of conductive carbon on the surface of the nanometer size Si particles. The conductive carbon deposited is preferably non-powdery. In embodiments of the invention, pyrolysis of the mixture is performed at a temperature of about 600-800° C., preferably about 650-750° C., more preferably about 725° C. The drying rate during pyrolysis can be for example about 3-10° C./min., preferably about 6° C./min. And the drying time can be for example about 30 minutes to 2 hours, preferably about 1 hour. This step can be conducted under inert atmosphere such as for example argon atmosphere.

In embodiments of the invention, a subsequent step of cooling the pyrolyzed mixture is performed. This step is conducted at a cooling rate of about 2° C./min.

Micrometer size Si particles obtained in the process according to the invention, particularly in dry grinding step (a), present a mean size of 0.1-100 µm. Nanometer size Si particles obtained in the process according to the invention, particularly in wet grinding step (b) present a mean size of the nanometer size particles obtained in step (b) is 10-100 nm.

The invention provides according to an aspect, for a particulate Si material which is prepared by the method according to the invention and as described above. In embodiments of the invention, a mean size of the particles is about 10-100 nm, preferably about 50-90 nm, more preferably about 70 nm. Moreover, in embodiments of the invention, the material has a carbon content of about 0.5-10% wt, preferably about 2-5% wt.

The invention provides according to another aspect, for an anode which is fabricated using the material according to the invention and as described above.

The invention provides according to yet another aspect, for an electrochemical cell or an electrochemical storage energy apparatus which comprises the anode according to the invention and as described above.

The invention provides according to a further aspect, for an electrochemical storage energy apparatus comprising the anode according to the invention and as described above. The electrochemical storage apparatus can be a lithium-ion battery, a silicium-air battery or a polymer battery.

Example 1

10 kg of commercially available metallurgical grade silicon (Si) was melted in an induction furnace using a graphite crucible under argon atmosphere. The liquid silicon was held for 10 minutes for complete homogenization at a temperature of 1450° C. and casted in a graphite mould to allow cooling to room temperature. The impurity content of the ingot obtained measured by X-ray fluorescence spectroscopy is less than 2% wt of the material.

Example 2

The ingot from Example 1 was crushed into centimeter size particles using a jaw crusher (JCA-100, Makino) with an abrasion resistant zirconia liner to lower metal contamination.

Example 3

The centimeter size particles from Example 2 was further ground by using a roll crusher (MRCA-1, Makino) having zirconia rolls to achieve millimeter size particles.

Example 4

Figure 2:
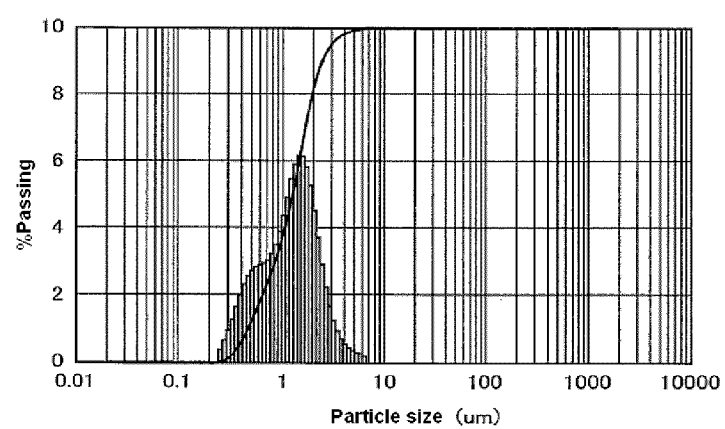
FIG. 2 shows a graph of the particles size distribution obtained from laser scattering analyzer observations (LA-950V2, Horiba) of a sample of micrometer size particles according to the invention.

The millimeter size particles from Example 3 were ground on a bead mill (PV-250, Hosokawa) using 5 mm zirconia beads to achieve micrometer size particles. Laser scattering analyzer observations (LA-950V2, Horiba) show that dry milling leads to micrometer size primary particles in the range of 0.3 µm-3 µm (FIG. 2).

Example 5

Figure 3:
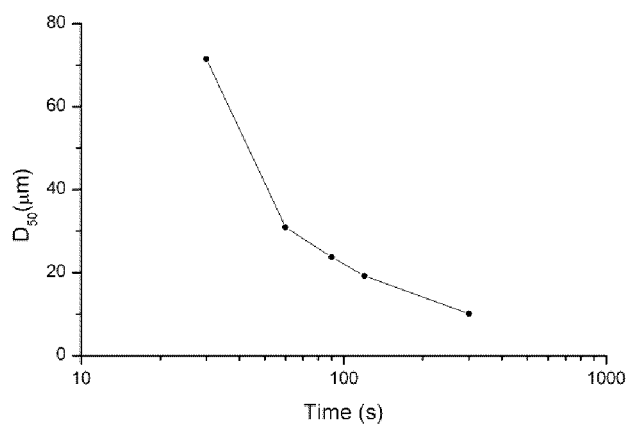
FIG. 3 shows the evolution of the average particle size ($d_{50}$) over time during dry grinding.

The millimeter size particles from Example 3 were ground on a puck and ring mill (Pulverisette 9, Fritsch) using tungsten carbide liner to achieve micrometer size particles (FIG. 3).

Figure 4:
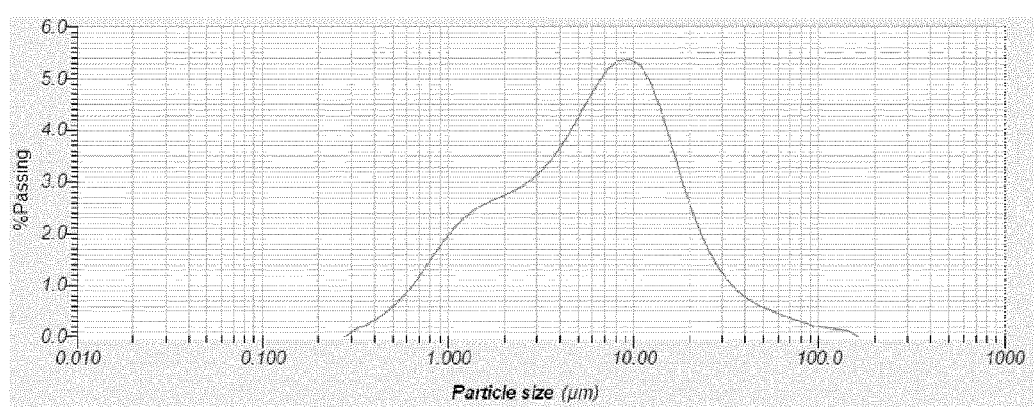
FIG. 4 shows a graph of the particle size distribution obtained from laser scattering analyzer observations (LA-950V2, Horiba) of a further sample of micrometer size particles according to the invention.

Laser scattering analyzer observations (LA-950V2, Horiba) show that dry milling leads to micrometer size primary particles in the range of 0.3 µm-100 µm after 300 seconds (FIG. 4).

Example 6

Figure 5:
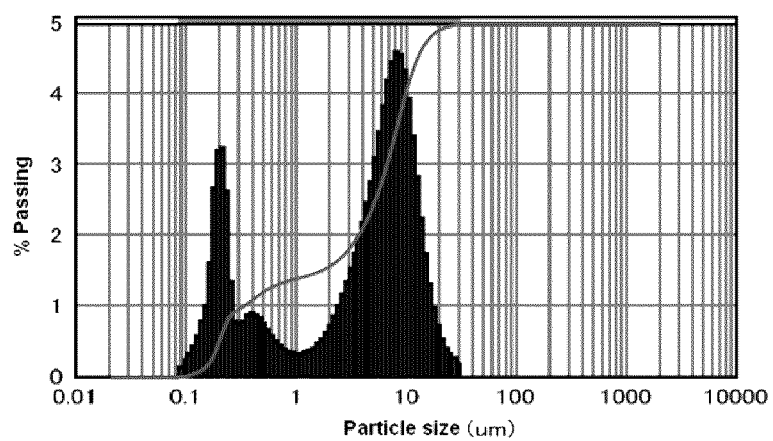
FIG. 5 shows a graph of the particle size distribution obtained from laser scattering analyzer observations (LA- 950V2, Horiba) of still a further sample of micrometer size particles according to the invention.

The millimeter size particles from Example 3 were ground by using a cyclone mill (150BMW, Shizuoka plant) to achieve micrometer sized powder. Laser scattering analyzer observations (LA-950V2, Horiba) show that dry milling leads to micrometer size primary particles in the range of 0.2 µm-20 µm after one pass (FIG. 5).

Example 7

Figure 6:
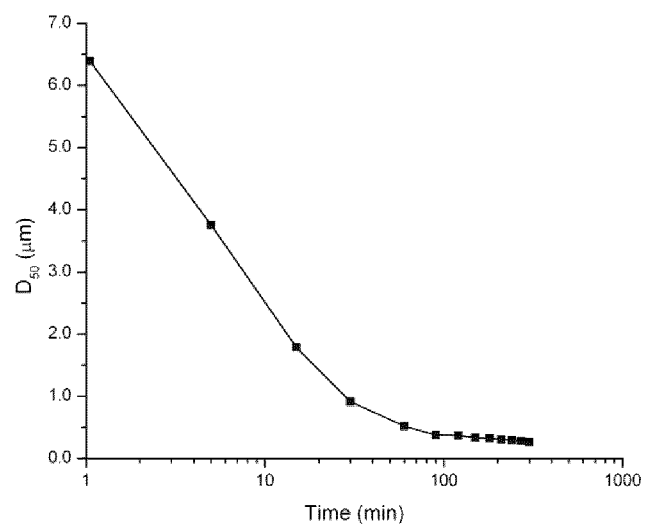
FIG. 6 shows the evolution of the average particle size ($d_{50}$) over time during wet grinding.

The micrometer size powder from Example 6 was dispersed in isopropyl alcohol (IPA) solution at 10% w of solid concentration in the presence of a Triton 100X surfactant agent (0.5% wt to solid) and then ground on a bead mill (SC100/32-ZZ mill, Nippon Coke) using 0.3 mm zirconia beads to achieve nanometer size particles (FIG. 6).

Figure 7:
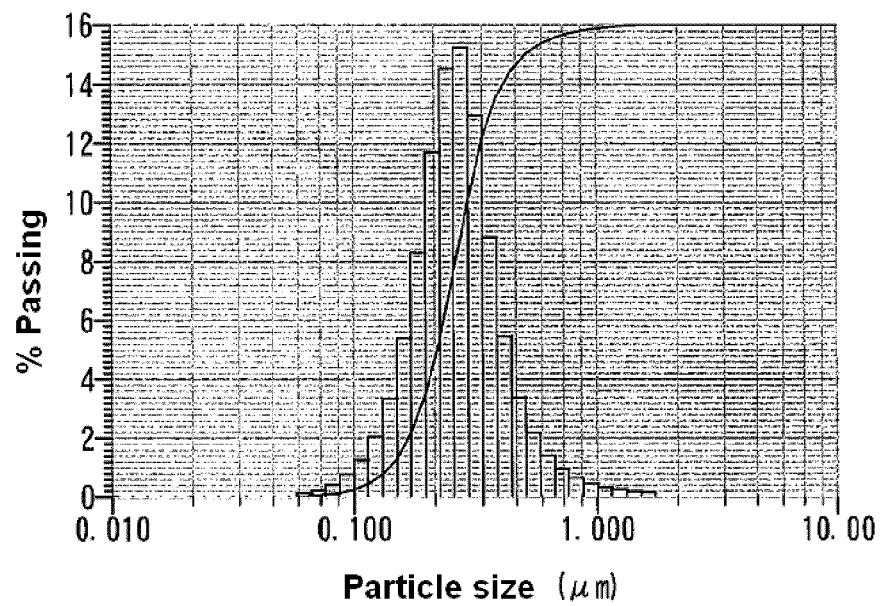
FIG. 7 shows a graph of the particle size distribution obtained from laser scattering analyzer observations (LA-950V2, Horiba) of a sample of nanometer size particles according to the invention.

Laser scattering analyzer observations (LA-950V2, Horiba) show that wet milling leads to nanometer size primary particles in the range of 100 nm-1000 nm after 300 minutes (FIG. 7).

Example 8

Figure 8:
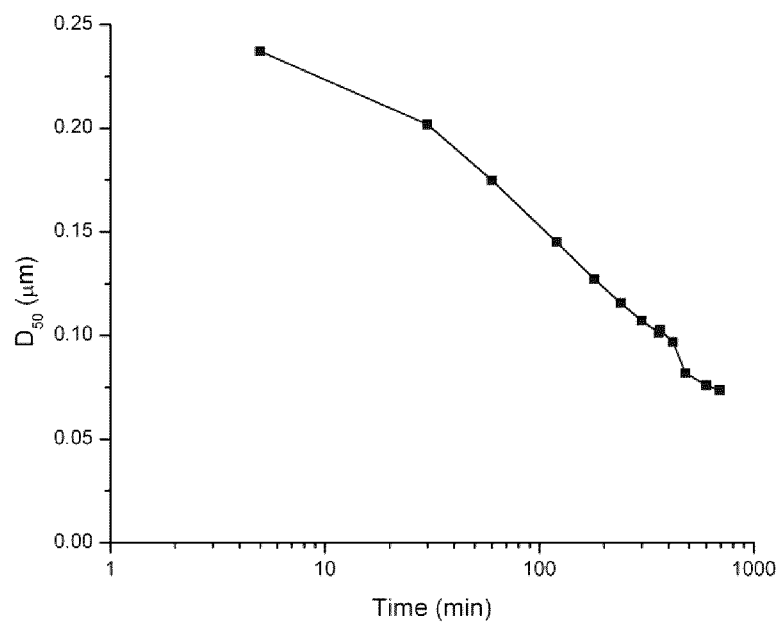
FIG. 8 shows the evolution of the average particle size ($d_{50}$) over time during a further wet grinding.

The particle dispersion from Example 7 was ground on a bead mill (MSC-100-ZZ mill, Nippon Coke) using 0.03 mm zirconia beads to achieve nanometer size particles (FIG. 8).

Figure 9:
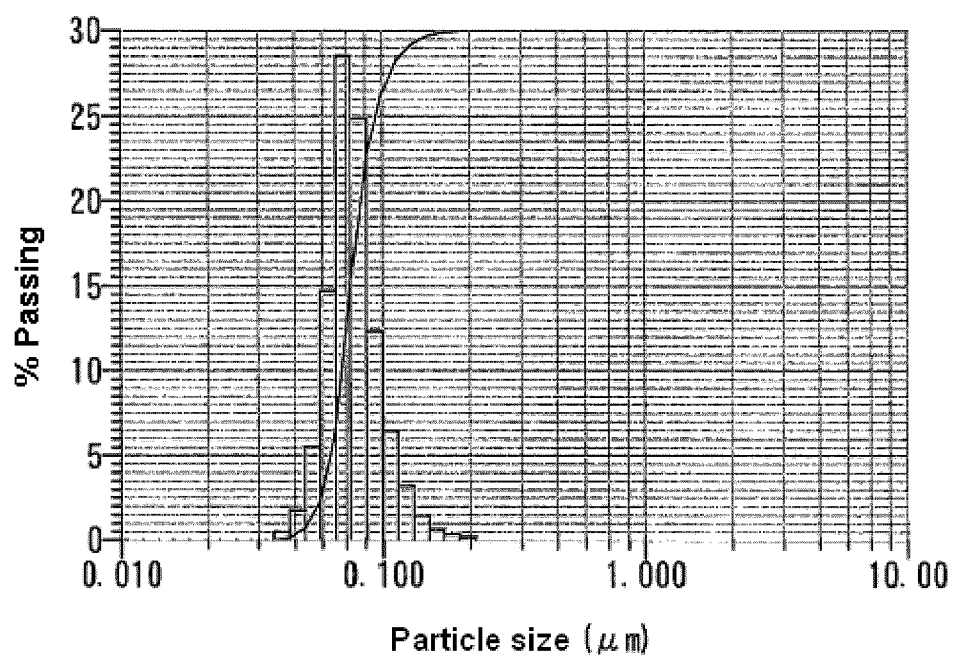
FIG. 9 shows a graph of the particle size distribution obtained from laser scattering analyzer observations (LA-950V2, Horiba) of a further sample of nanometer size particles according to the invention.

Laser scattering analyzer observations (LA-950V2, Horiba) show that wet milling leads to nanometer size primary particles in the range of 40 nm-150 nm after 695 minutes (FIG. 9).

Example 9

The experiment was conducted as outlined above in Example 7 with a difference that the micrometer size powder was dispersed in cyclohexane (instead of IPA). After wet milling, the particle size was in the range of 80 nm-180 nm after 700 minutes.

Example 10

In a last step, a solution of poly(maleic anhydride-1-alt-octadecene) dissolved in IPA is mixed with the Si in IPA, in a ratio of 5% wt poly(maleic anhydride-1-alt-octadecene) over Si. The mixed solution was stirred thoroughly and then dried at room temperature by blowing with dry air while stirring.

The dried powder is heated to 725° C. at 6° C./min and held for 1 h at 725° C. in a rotary kiln under argon flow, and then cooled at a cooling rate of 2° C./min. After this treatment, large aggregates of carbon coated nanoparticles having a mean size of 50-200 nm are obtained. The pyrolytic carbon content is 1.4%, as measured by a C, S analyzer (LECO method). The product thus obtained is designated by C—Si.

Example 11

Figure 10:
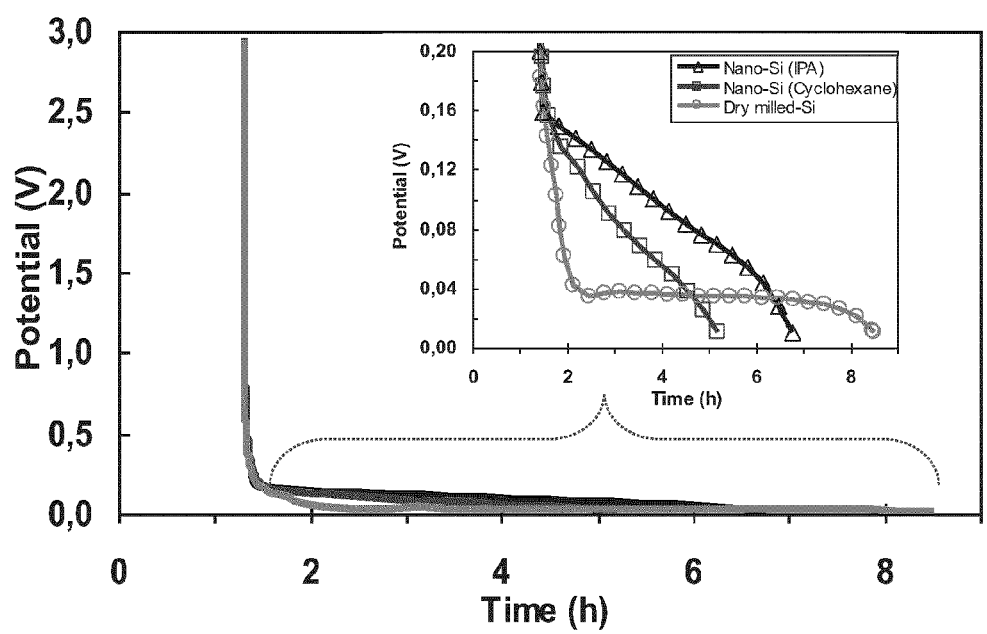
FIG. 10 shows voltages profiles of the Li/Si composite anode in 1M $LiPF_6$-EC-DEC.

For the electrochemical evaluation, the anodes were prepared by mixing the Si powder with carbon conductor and alginate Water-soluble binder and $H_2O$. Thereafter, the slurry was applied to the copper foil and dried at 120° C. in vacuum for 12 h. The electrochemical characterization was performed in coin-type cell with lithium metal as anode in 1M $LiPF_6$-EC-DEC. Three anodes composite electrodes were evaluated; dry milled Si (Example 4), nano-Si in IPA (Example 8) and nano-Si in cyclohexane (Example 9). The cells were cycled between 2.5V and 10 mV. The first discharge in FIG. 10 shows that the particle size affects the voltage profile of the cell. Also, by using a different solvent as grinding media helps to reduce further the particles size. The mean voltage was gradually increased when the particle size decreased: 35 mV for Si-dry milled (0.3-3.0 µm), 78 mV for nano-Si-Cyclohexane (80-180 nm) and 92 mV for nano-Si-IPA (50-150 mV). Reducing the particle size improves performance of this material and also increases slightly the discharge voltage from zero volt, which indicates that the safety of the battery is improved.

Although the present invention has been described hereinabove by way of specific embodiments thereof, it can be modified, without departing from the spirit and nature of the subject invention as defined in the appended claims.

The present description refers to a number of documents, the content of which is herein incorporated by reference in their entirety.

The invention claimed is:

1. A method for preparing a particulate material comprising particles of silicon or an oxide thereof, the method comprising:
   (a) dry grinding particles from an ingot of silicon or an oxide thereof to obtain micrometer size particles; and
   (b) wet grinding the micrometer particles dispersed in a solvent carrier to obtain nanometer size particles having a size between 10 to 100 nanometers, optionally a stabilizing agent is added during or after the wet grinding;
   wherein the ingot comprises at least 98% of silicon or an oxide thereof.

2. A method according to claim 1, further comprising a step of (c) drying the nanometer size particles.

3. A method according to claim 2, further comprising the steps of: (d) mixing the nanometer size particles with a carbon precursor; and (e) pyrolysing the mixture, thereby forming a coat of conductive carbon on at least part of the surface of the particles.

4. A method according to claim 3, wherein the conductive carbon formed is non-powdery, and is in an amount of about 0.5-10% wt of the particulate material.

5. A method according to claim 3, wherein step (e) is performed at a temperature of about 600-800° C.

6. A method according to claim 3, wherein step (e) is performed at a rate of about 3-10° C./min.

7. A method according to claim 3, wherein step (e) is performed during a period of about 30 minutes to 2 hours.

8. A method according to claim 3, wherein step (e) is performed under inert atmosphere.

9. A method according to claim 1, wherein step (a) is performed in a bead mill, a puck and ring mill, a jet mill or a cyclone mill.

10. A method according to claim 1, wherein the carrier solvent is an organic solvent selected from the group consisting of isopropanol and cyclohexane, or is water.

11. A method according to claim 1, wherein an amount of the solvent carrier is adjusted such as to represent about 5-20% wt of the particulate material.

12. A method according to claim 1, wherein the carbon precursor is selected from the group consisting of an organic material, a cross-linkable monomer, oligomer, polymer and copolymer.

13. A method according to claim 1, wherein the carbon precursor is poly(maleic anhydride-1-alt-octadecene).

14. A method according to claim 1, wherein the stabilizing agent is a surfactant.

15. A method according to claim 1, wherein the particulate material is used as an anode in an electrochemical cell or an electrochemical storage energy apparatus selected from the group consisting of a lithium-ion battery, a silicon-air battery and a polymer battery.

16. A method for preparing a particulate material comprising particles of silicon or an oxide thereof, the method comprising:
   (a) dry grinding particles from an ingot of silicon or an oxide thereof to obtain micrometer size particles;
   (b) wet grinding the micrometer particles dispersed in a solvent carrier to obtain nanometer size particles having a size between 10 to 100 nanometers, optionally a stabilizing agent is added during or after the wet grinding;
   (c) mixing the nanometer size particles with a carbon precursor; and
   (d) pyrolysing the mixture, thereby forming a coat of conductive carbon on at least part of the surface of the particles;
   wherein the ingot comprises at least 98% of silicon or an oxide thereof.

17. A method according to claim 16, wherein the method comprises drying the nanometer size particles.

* * * * *